United States Patent [19]

Leshner

[11] Patent Number: 4,904,182

[45] Date of Patent: Feb. 27, 1990

[54] CATALYTIC BURNER WITH DUAL MODE VENTURIS

[76] Inventor: Michael D. Leshner, 6481 Belleview Dr., Columbia, Md. 21046

[21] Appl. No.: 223,233

[22] Filed: Jul. 22, 1988

[51] Int. Cl.[4] ............................................. F23D 14/62
[52] U.S. Cl. .................................. 431/354; 431/346; 431/355; 126/38; 239/407
[58] Field of Search ............... 431/328, 354, 355, 346, 431/348, 344, 158; 239/407, 451, 581.1; 126/38

[56] References Cited

U.S. PATENT DOCUMENTS

| | | | |
|---|---|---|---|
| 806,827 | 12/1905 | Noyes | 431/355 |
| 928,497 | 7/1909 | Carnahan | 431/355 |
| 957,358 | 5/1910 | Meyer-Zimmerli | 431/355 |
| 966,480 | 8/1910 | Schulze | 431/280 |
| 987,459 | 3/1911 | Harrison et al. | 431/355 |
| 1,019,318 | 3/1912 | Grandjean | 431/355 |
| 1,546,286 | 7/1925 | Koch | 239/407 |
| 4,588,373 | 5/1986 | Tonon et al. | 431/328 |

FOREIGN PATENT DOCUMENTS 16795 of 1907 United Kingdom ................. 239/407

Primary Examiner—Carl D. Price
Attorney, Agent, or Firm—Richard C. Woodbridge

[57] ABSTRACT

The present invention relates to a two stage venturi for a catalytic burner wherein a large exit aperture size and a small air entrainment opening are used to provide a low velocity, rich fuel/air mixture for the pre-heating process followed by a small exit aperture size and a large air entrainment opening to provide a high velocity, lean fuel/air mixture for the catalytic combustion process. Concentric rotating sleeves are used to vary the size of the exit apertures and the air entrainment openings.

8 Claims, 2 Drawing Sheets

CATALYTIC BURNER WITH DUAL MODE VENTURIS

BACKGROUND OF THE INVENTION

The present invention relates to dual mode venturis for a catalytic burner, particularly catalytic campstoves, wherein one mode is used for initial ignition of the fuel and stable pre-heating of the catalyst-coated plate and a second mode is used to prevent flashback during steady-state regime catalytic combustion phase.

Before operating in the steady-state regime catalytic combustion phase, the catalyst-coated plate of a catalytic burner, such as is disclosed in U.S. Pat. No. 4,588,373, issued May 13, 1986 to Tonon et al., must be pre-heated to a temperature, on the order of 300°–700° Kelvin. This temperature, referred to as a light-off temperature, is a function of the specific fuel mixture, and is accomplished by the heating of the underside of the catalyst-coated plate by means of a conventional flame. This conventional flame is fueled by a fuel and air mixture from a venturi pipe leading to apertures in the burner head. During this pre-heating or warm-up phase, it is desirable that the fuel or gas velocity from the apertures of the burner head is less than the flame speed in the fuel mixture. This allows the flame to establish itself at the burner head to heat the catalytic-coated plate directly. During this phase, if the fuel or gas velocity were greater than the flame speed, a flame would not be able to attach to the burner because it would "blow off", thereby making it difficult or impossible to maintain a stable flame during pre-heating except possibly in regions of reduced gas velocity or recirculating, turbulent flow.

However, after the warm-up phase, during the catalytic combustion phase, it is desirable that the fuel or gas velocity be higher than the flame velocity so as to establish and maintain the combustion at the catalytic plate and away from the burner head. If the fuel or gas velocity is lower than the flame velocity, then the temperature of the fuel mixture flowing from the burner head to the plate entrance may be high enough that a flame may travel back to and stabilize at the burner head thereby preventing stable catalytic combustion operation.

Prior efforts made to merely vary the size of the burner exit holes between the warm-up and the catalytic combustion phases had an unwanted side effect of changing the quantity of air entrained into the venturi, thereby causing the air-fuel mixture to change.

Additionally, in the prior art, catalytic burners were optimized for radiative heat transfer which is particularly well-adapted for cooking. However, such applications, as drying off fibers or domestic heating with conventional heat exchangers demand convective heat transfer, or the production of a very hot gas rather than radiative heat transfer. Heretofore, it has not been understood how to systematically vary the ratio of radiative to conductive heat transfer in a catalytic burner.

In view of the above, it is the principal object of this invention to provide an improved catalytic burner apparatus in which the fuel mixture exits the burner head during the pre-heating phase at a velocity less than the flame velocity so that the flame will not "blow off" the burner and in which the fuel mixture exits the burner head during the steady-state catalytic combustion phase at a velocity greater than the flame speed so that the locus of the combustion is on the catalytic plate and does not "flash back" to the burner.

It is therefore a further object of this invention to provide for varying the size of the air entrainment openings at the venturi's entrance simultaneously with varying the fuel velocity from the burner head so as to maintain an optimal air-fuel mixture.

It is therefore a further object of this invention to provide a method for varying the proportion between radiated and convected energy within a catalytic burner.

SUMMARY OF THE INVENTION

The above and other beneficial objects are achieved in accordance with the present invention by providing a catalytic burner with two concentric cylindrical venturi tubes. The outer venturi tube has apertures or exit holes of a first diameter of even integer multiples of 30 degrees about a circular section of its periphery and apertures or exit holes of a second diameter, smaller than the first diameter, at odd integer multiples of 30 degrees about a circular section of its periphery. The inner venturi tube has apertures or exit holes of the first diameter at odd integer multiples of 30 degrees about a circular section of its periphery and apertures or exit holes of the second diameter at even integer multiples of 30 degrees about a circular section of its periphery.

Additionally, the outer venturi has a circular air entrainment opening at the venturi entrance. The inner venturi has a pear-shaped air entrainment opening which is formed by slightly overlapping two adjacent circles, one of a diameter of the air entrainment opening of the outer venturi and one at a reduced diameter.

This allows rotation of the outer venturi so that the apertures or exit holes of the larger first diameter of the inner and outer venturis are aligned and the circular air entrainment openings of the outer venturi are aligned with the smaller portion of the pear-shaped air entrainment openings of the inner venturi. This results in a lower gas speed from the burner allowing the flame to attach itself to the burner head during the pre-heating stage without "blow off". Additionally a desirable rich fuel/air mixture is maintained.

After the pre-heating stage is over, the outer venturi is rotated, manually or automatically, momentarily cutting off gas flow as all exit holes are blocked thereby extinguishing the conventional pre-heating flame. Further rotation aligns the apertures of a first diameter of the outer venturi with the aperture of a second diameter of the inner venturi and vice versa thereby resulting in effective apertures of the smaller second diameter and a resultant gas speed which is increased so as to establish catalytic combustion at the catalytic plate with a substantially reduced tendency of "flashing back" to the burner. Additionally, the alignment of the air entrainment openings of the inner and outer venturis is changed so as to increase the effective size of the air entrainment openings thereby resulting in a lean air/fuel mixture more desirable for the catalytic combustion regime.

DETAILED DESCRIPTION OF THE PREFERRED EMBODIMENT

Figure 1:
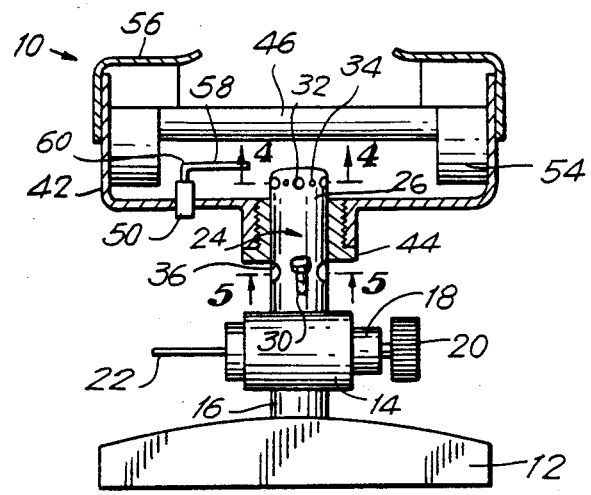
FIG. 1 is a simplified side elevational sectional view of a catalytic stove in accordance with the present invention.

Reference is now made to the drawings wherein like numerals indicate like elements throughout the several views. FIG. 1 discloses the catalytic burner apparatus 10. Apparatus 10 includes a base 12 which proves stability for both the apparatus and the cooking vessel (not shown) which is placed upon the apparatus. Additionally, base 12 acts as a heat dissipator for the rest of the apparatus. Valve body 14 is mounted on base 12 by mounting post 16 thereby proViding a heat transfer path to the base 12. Valve body 14 includes a valve 18 which is mounted for rotation therein. The rotation of valve 18 is responsive to knob 20 thereby controlling or metering the flow of gas from a gas source (not shown), through needle 22 and into venturi assembly 24. Needle 22 mounts the gas source (not shown) to apparatus 10. Needle 22 further serves as a heat exchanger for fuel vaporization (as the fuel and heat are in counterflow, this creates a heat exchanger with a high thermal gradient between the hot 'outlet' and the cold 'inlet' end) and as a heat insulator between the valve body 14.

Valve 18 has an orifice (not shown) for the passage of fuel from the valve 18 to the venturi assembly 24. This orifice is typically 0.008 inches in diameter, includes a sintered metal filter (not shown), and acts as a heat exchanger for further fuel vaporization.

Figure 2:
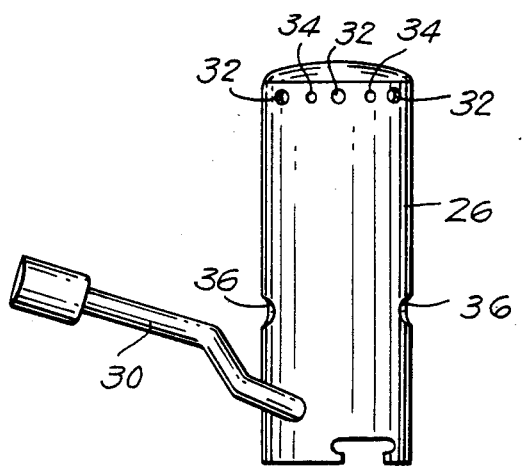
FIG. 2 is a plan view, partly in elevation, of the outer venturi of the present invention.
Figure 3:
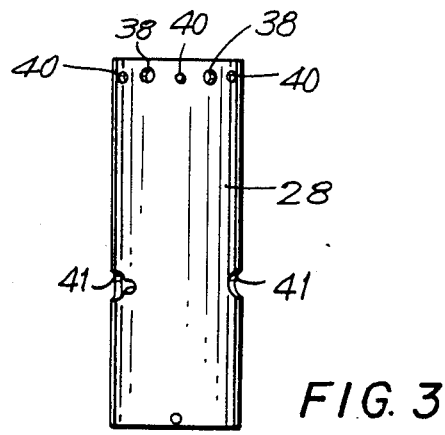
FIG. 3 is a plan view, partly in elevation, of the inner venturi of the present invention.
Figure 4:
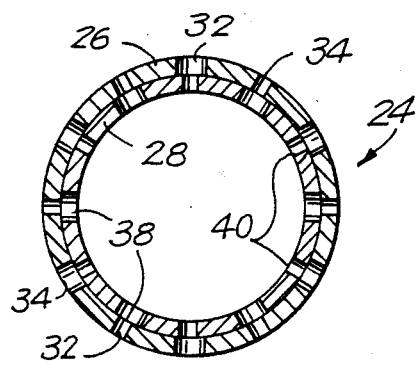
FIG. 4 is a cross-sectional view along 4—4 in FIG. 1.
Figure 5:
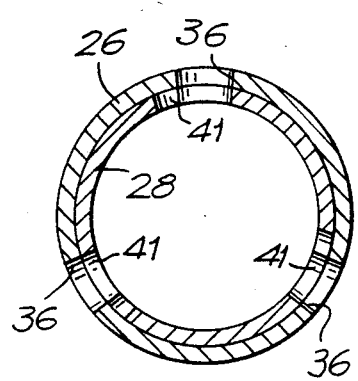
FIG. 5 is a cross-sectional view along 5—5 in FIG. 1.

The venturi/diffuser assembly 24 is mounted on valve body 14 with its longitudinal axis vertical so as to receive gas from the orifice of valve 18. Venturi/diffuser assembly 24 includes an outer sleeve 26 (see FIG. 2) concentric with an inner sleeve 28 (see FIG. 3). Inner sleeve 28 is fixed onto valve body 14 and outer sleeve 26 rotates about inner sleeve 28 responsive to the user manually pushing on lever 30 attached thereto.

The outer sleeve 26 has larger diameter exit apertures 32 (typically ⅛ inch) at even integer multiple of 30 degrees (30 degrees may be replaced by other values of 360 degrees divided by an even integer) about a circular portion near the upper end of outer sleeve 26. Outer sleeve 26 further has smaller diameter exit apertures 34 (typically 1/16 inch) at odd integer multiples of 30 degrees (or some other suitable angle) about the same circular portion near the upper end of outer sleeve 26.

The outer sleeve 26 includes circular air entrainment openings 36 about a circular portion near the lower end of outer sleeve 26 and a lever 30 integrally attached thereto.

The inner sleeve 28 has larger diameter exit apertures 38 at odd integer multiples of 30 degrees (or some other appropriate angle) about a circular portion near the upper end of inner sleeve 28. Inner sleeve 28 further has smaller diameter exit apertures 40 at even integer multiples of 30 degrees (or some other appropriate angle) about the same circular portion near the upper end of inner sleeve 28.

The inner sleeve 28 includes pear-shaped air entrainment openings 41 about a circular portion near the lower end of inner sleeve 26.

As will be described in more detail, this venturi/diffuser assembly 24 allows a user to select (1) rich fuel/air mix (reduced air entrainment opening size) with a low fuel velocity (increased exit hole diameter) for easy ignition without "blow off" from the exit holes thereby being suitable for ignition or preheating or (2) a lean fuel/air mix (enlarged air entrainment opening size) with a high fuel velocity (decreased exit hole diameter) for steady-state regime catalytic combustion without "flash back".

Venturi/diffuser assembly 24 further acts as a structural element to engage the cup 42 and as a heat transfer path from the cup 42 to the valve body 14. The top of venturi/diffuser assembly acts as a heat collector.

Flange 44 adds detachable structural support and a heat transfer path between venturi/diffuser assembly 24 to cup 42.

Cup 42 is a bowl-shaped element which is supported by flange 44 and supports catalyst assembly 46 via gasket 54, insulator 48, igniter 50, and heat collector 52. Further, cup 42 provides a heat transfer path from the heat collector 52 to the venturi/diffuser assembly 24.

A gasket 54 is mounted between the cup 42 and catalyst assembly 46 so as to prevent leakage of the fuel mixture around the catalyst assembly 46 and to cushion catalyst assembly 46 against damage.

The catalyst assembly 46 includes a ceramic substrate with a catalytic coating. This coating may be selected from the group consisting of platinum, palladium, rhodium and iridium as described in the aforementioned U.S. Pat. No. 4,588,373. This catalytic coating effects catalytic combustion when the air/fuel mixture contacts the pre-heated catalytic assembly 46.

Heat collector 56 mounts on cup 42 over catalyst assembly 46 and gasket 54. The heat collector 56 transfers heat from the catalytic assembly 46 to the cup 42 and to the cooking vessel (not shown). The heat transfer connection between the heat collector 56 and cup 24 should be efficient so as to effect the preliminary heat transfer for subsequent heat transfer through the aforementioned structural parts of apparatus 10.

The igniter 50 creates a high voltage for spark ignition. While the preferred embodiment discloses the igniter 50 attached to the cup 42, other acceptable mounting locations are the valve body 14, the venturi/diffuser assembly 24 or the base 12. Electrode 58 is an electrical terminal for spark ignition of the fuel/air mixture. The electrode 58 is connected to the igniter 50 by an insulated wire 60 and is typically positioned to create a ⅛ gap with the venturi/diffuser assembly 24 which acts as ground.

To use this apparatus 10, a user rotates lever 30 so as to align enlarged exit apertures 32 of outer sleeve 26 with enlarged exit apertures 38 of inner sleeve 28. This large effective exit aperture reduces the gas flow velocity therefrom thereby reducing "blow off" during the pre-heating stage. Additionally, this aligns air entrainment openings 36 of outer sleeve 26 with the reduced portion of the pear-shaped air entrainment openings 41 of the inner sleeve 28 thereby increasing the richness of the fuel/air mixture as is desired during the pre-heating stage.

The user then opens valve 18 by turning knob 18 thereby allowing flow from the fuel source (not shown) through needle 22, valve 18, venturi/diffuser assembly 24 and out the exit apertures 32 and 38.

The user then activates the electrode 58 to ignite the fuel as it exits venturi/diffuser 24.

The user allows the ignited fuel to heat the catalyst assembly 46 for approximately sixty seconds or until the valve body 14 is warm to the touch. The user then rotates lever 30 thereby aligning the smaller diameter exit apertures 34 of the outer sleeve 26 with the larger diameter exit apertures of 38 of inner sleeve 28. Likewise, larger diameter exit apertures 32 of the outer sleeve 26 are aligned with the smaller diameter exit apertures 40 of inner sleeve 28 thereby creating effective exit aperture of the smaller diameter about the periphery of the venturi/diffuser assembly 24. This provides a higher exit velocity of the fuel mixture thereby preventing "flash back" during steady-state catalytic operation. Additionally, this aligns air entrainment openings 36 of outer sleeve 26 with the larger portion of the pear-shaped air entrainment openings 40 of the inner sleeve thereby increasing the leanness of the fuel air mixture as is required by steady-state catalytic operation. As the outer sleeve 26 rotates around inner sleeve 28, the exit apertures 32, 34, 38, 41 are temporarily blocked. If this blockage does not extinguish the flame, the user extinguishes the flame by turning valve 18 by knob 20. The valve 18 is likewise reopened and adjusted to a desired level so that fuel/air mixture exits venturi/diffuser assembly 24, impinges upon catalyst element 46 whereupon it is catalytically combusted.

Thus, in accordance with the above, the aforementioned objectives are effectively attained.

Having thus described the invention, what is claimed is:

1. A venturi for a gas burner comprising: a venturi having an elongated tubular member; means at one location on said tubular member for receiving gas fuel under pressure; variable sized gas exit apertures at a second location on said tubular member; an air inlet aperture at a third location having means for varying the size thereof; and means operable by a user for simultaneously increasing the size of said exit apertures and decreasing the size of said air inlet aperture so that a gas exit velocity is less than a flame speed, and for simultaneously decreasing the size of said exit apertures and increasing the size of said inlet aperture so that the gas exit velocity is greater than the flame speed.

2. A venturi for a gas burner, said venturi comprising variable diameter exit apertures whereby a user may select an exit aperture of a first diameter whereby a gas exit velocity is less than a flame speed and exit apertures of a second diameter whereby a gas exit velocity is greater than a flame speed and further comprising:

an inner hollow cylindrical sleeve with apertures of said first diameter and said second diameter; and an outer hollow cylindrical sleeve relatively rotably concentric with said inner hollow cylindrical sleeve, said outer hollow cylindrical sleeve having apertures of said first diameter and said second diameter.

3. The venturi of claim 2 wherein said first diameter is larger than said second diameter.

4. The venturi of claim 3 wherein:

said outer hollow cylindrical sleeve can be relatively rotated about said inner hollow cylindrical sleeve to a first position wherein said apertures of a first diameter of said inner and outer hollow cylindrical sleeves align so as to form exit apertures of said first diameter; and said outer hollow cylindrical sleeve can be relatively rotated about said inner hollow cylindrical sleeve to a second position wherein said apertures of said inner and outer hollow cylindrical sleeves align so as to form exit apertures of said second diameter.

5. The venturi of claim 4 wherein:

said apertures of said first diameter are spaced at even integer multiples of an angle along a transverse circular cross section of said outer hollow cylindrical sleeve and at odd integer multiples of said angle along a transverse circular cross section of said inner hollow cylindrical sleeve; and said apertures of said second diameter are spaced at odd integer multiples of said angle along said transverse circular cross section of said outer hollow cylindrical sleeve at even integer multiples of said angle along said transverse circular cross section of said inner hollow cylindrical sleeve.

6. The venturi of claim 5 wherein said angle is 360 degrees divided by an even integer.

7. The venturi of claim 5 wherein said angle is 30 degrees.

8. The venturi of claim 4 further comprising:

an inner air entrainment opening in said inner hollow cylindrical sleeve;

an outer air entrainment opening in said outer hollow cylindrical sleeve;

whereby an effective air entrainment opening is varied in size between said first and second position as the overlap between said inner and outer air entrainment openings is varied.

* * * * *